(12) United States Patent
Huynh et al.

(10) Patent No.: US 8,296,378 B2
(45) Date of Patent: *Oct. 23, 2012

(54) ADAPTIVE ELECTRONIC MESSAGING

(75) Inventors: Anh Huynh, Beaverton, OR (US); Hemingway Huynh, Beaverton, OR (US); Jeffrey Michael Farnsworth, Beaverton, OR (US)

(73) Assignee: Prolifiq Software Inc., Beaverton, OR (US)

( * ) Notice: Subject to any disclaimer, the term of this patent is extended or adjusted under 35 U.S.C. 154(b) by 87 days.

This patent is subject to a terminal disclaimer.

(21) Appl. No.: 12/728,085

(22) Filed: Mar. 19, 2010

(65) Prior Publication Data

US 2010/0235457 A1 Sep. 16, 2010

Related U.S. Application Data

(63) Continuation of application No. 10/976,057, filed on Oct. 27, 2004, now Pat. No. 7,707,317, which is a continuation-in-part of application No. 10/611,698, filed on Jun. 30, 2003, now Pat. No. 7,966,374.

(60) Provisional application No. 60/393,176, filed on Jul. 1, 2002.

(51) Int. Cl.
*G06F 15/16* (2006.01)

(52) U.S. Cl. ........................................... 709/206

(58) Field of Classification Search .................. None
See application file for complete search history.

(56) References Cited

U.S. PATENT DOCUMENTS

| | | |
|---|---|---|
| 5,983,022 A | 11/1999 | Watkins et al. |
| 5,987,504 A | 11/1999 | Toga |
| 6,014,689 A | 1/2000 | Budge et al. |
| 6,023,714 A | 2/2000 | Hill et al. |
| 6,035,339 A | 3/2000 | Agraharam et al. |
| 6,092,114 A | 7/2000 | Shaffer et al. |
| 6,119,165 A | 9/2000 | Li et al. |
| 6,167,441 A | 12/2000 | Himmel |
| 6,182,094 B1 | 1/2001 | Humpleman et al. |
| 6,212,564 B1 | 4/2001 | Harter et al. |
| 6,243,392 B1 | 6/2001 | Uemura et al. |
| 6,247,050 B1 | 6/2001 | Tso et al. |
| 6,253,207 B1 | 6/2001 | Malek et al. |
| 6,279,030 B1 | 8/2001 | Britton et al. |
| 6,279,041 B1 | 8/2001 | Baber et al. |
| 6,292,554 B1 | 9/2001 | Oden |
| 6,317,761 B1 | 11/2001 | Landsman et al. |
| 6,317,795 B1 | 11/2001 | Malkin et al. |
| 6,345,279 B1 | 2/2002 | Li et al. |
| 6,345,298 B1 | 2/2002 | Moriya |
| 6,356,921 B1 | 3/2002 | Kumar et al. |

(Continued)

OTHER PUBLICATIONS

Backweb Technologies, Inc.; "BackWeb and ElasticEdge Enable Easy Delivery of Rich Media Content with BackWeb's Push Technology," San Jose, California, http://216.239.51.100/sea...relelasticedge.html+email+html+push+any+type+of+media+&hl=3, 2 pg., Jun. 29, 2000.

(Continued)

*Primary Examiner* — Ario Etienne
*Assistant Examiner* — Clayton R Williams
(74) *Attorney, Agent, or Firm* — Schwabe Williamson & Wyatt

(57) ABSTRACT

In accordance with embodiments of the invention, adaptive electronic message services are provided for generating and supplementing adaptive electronic messages with digital content items.

21 Claims, 6 Drawing Sheets

U.S. PATENT DOCUMENTS

| | | | |
|---|---|---|---|
| 6,360,252 B1 | 3/2002 | Rudy et al. | |
| 6,363,524 B1 | 3/2002 | Loy | |
| 6,393,605 B1 | 5/2002 | Loomans | |
| 6,470,378 B1 | 10/2002 | Tracton | |
| 6,480,537 B1 | 11/2002 | Agrawal et al. | |
| 6,496,980 B1 | 12/2002 | Tillman et al. | |
| 6,563,912 B1 | 5/2003 | Dorfman et al. | |
| 6,594,699 B1 | 7/2003 | Sahai et al. | |
| 6,625,460 B1 | 9/2003 | Patil | |
| 6,643,684 B1 | 11/2003 | Malkin et al. | |
| 6,704,024 B2 | 3/2004 | Robotham | |
| 6,704,396 B2 | 3/2004 | Parolkar et al. | |
| 6,738,803 B1 | 5/2004 | Dodrill et al. | |
| 6,742,043 B1 * | 5/2004 | Moussa et al. | 709/232 |
| 6,760,916 B2 | 7/2004 | Holtz et al. | |
| 6,763,377 B1 | 7/2004 | Belknap et al. | |
| 6,792,575 B1 | 9/2004 | Samaniego et al. | |
| 6,795,863 B1 | 9/2004 | Doty, Jr. | |
| 6,829,633 B2 | 12/2004 | Gelfer et al. | |
| 6,832,241 B2 | 12/2004 | Tracton | |
| 6,904,450 B1 | 6/2005 | King et al. | |
| 6,906,818 B1 | 6/2005 | Makishima | |
| 6,938,077 B2 | 8/2005 | Sanders | |
| 6,961,754 B2 | 11/2005 | Christopoulos et al. | |
| 6,970,602 B1 | 11/2005 | Smith et al. | |
| 6,976,082 B1 | 12/2005 | Ostermann et al. | |
| 6,978,418 B1 | 12/2005 | Bain et al. | |
| 6,992,983 B1 | 1/2006 | Chatterjee | |
| 6,996,618 B2 | 2/2006 | Apostolopoulos et al. | |
| 7,003,794 B2 | 2/2006 | Arye | |
| 7,024,485 B2 | 4/2006 | Dunning et al. | |
| 7,051,084 B1 | 5/2006 | Hayton | |
| 7,061,928 B2 | 6/2006 | Giroti et al. | |
| 7,228,343 B2 | 6/2007 | Sanders | |
| 7,251,678 B2 | 7/2007 | Mori | |
| 2001/0016869 A1 | 8/2001 | Baumeister et al. | |
| 2001/0034769 A1 | 10/2001 | Rast | |
| 2001/0043516 A1 | 11/2001 | Gelfer et al. | |
| 2001/0047517 A1 | 11/2001 | Christopoulos et al. | |
| 2002/0016818 A1 | 2/2002 | Kirani et al. | |
| 2002/0032754 A1 | 3/2002 | Logston | |
| 2002/0065925 A1 | 5/2002 | Kenyon et al. | |
| 2002/0073217 A1 | 6/2002 | Ma et al. | |
| 2003/0028647 A1 | 2/2003 | Grosu | |
| 2003/0055925 A1 | 3/2003 | McAlinden | |
| 2003/0093565 A1 | 5/2003 | Berger et al. | |
| 2003/0097485 A1 | 5/2003 | Horvitz et al. | |
| 2003/0110234 A1 | 6/2003 | Egli et al. | |
| 2003/0110236 A1 * | 6/2003 | Yang et al. | 709/219 |
| 2003/0154253 A1 | 8/2003 | Smith et al. | |
| 2003/0161448 A1 | 8/2003 | Parolkar et al. | |
| 2003/0200263 A1 | 10/2003 | Goldberg | |
| 2003/0236892 A1 | 12/2003 | Coulombe | |
| 2003/0236917 A1 | 12/2003 | Gibbs et al. | |
| 2004/0083291 A1 * | 4/2004 | Pessi et al. | 709/227 |
| 2004/0133640 A1 | 7/2004 | Yeager et al. | |
| 2004/0225753 A1 * | 11/2004 | Marriott et al. | 709/246 |
| 2005/0005022 A1 | 1/2005 | Taylor | |
| 2005/0060381 A1 | 3/2005 | Huynh | |
| 2005/0076089 A1 * | 4/2005 | Fonseca | 709/206 |
| 2005/0165913 A1 * | 7/2005 | Coulombe et al. | 709/219 |
| 2005/0262206 A1 * | 11/2005 | Weir et al. | 709/206 |
| 2007/0083810 A1 | 4/2007 | Scott | |
| 2007/0283048 A1 | 12/2007 | Theimer | |
| 2008/0114830 A1 | 5/2008 | Welingkar | |

OTHER PUBLICATIONS

Backweb Technologies, Inc.; "BackWeb Launches Universal Push Initiative," San Jose, California, 4 pg., http://216.239.51.100/searc.../reluniv push.html+email+html+push+any+type+of+media+&hl=3, Jul. 24, 2000.

Bluestreak; "Rich Media," http://www.bluestreak.com, 6 pg. [accessed Jun. 13, 2002].

Boldfish, Inc.; "An Overview of Rich Media," Santa Clara, California, 4 pg., 2001.

Cisco Systems, Inc.; "The Cisco Content Delivery Network Solution for the Enterprise," San Jose, California, 18 pg., 2000.

Inktomi Corporation; "Inktomi, Portal, Redback and Sun to Launch First Integrated Solution for Broadband Services Delivery," Foster City, California, Sep. 19, 2000.

Multiforce; Cforce, Salesforce.com, internet publication, http://www.salesforce.com (accessed Dec. 3, 2005).

Push Publishing Technologies; "Push Publishing Technologies of Yesterday and Today," http://216.239.51.100/search?q=cac.../t4a.html+email+html+push+any+type+of+media+&hl=3, 6 pg., [accessed Jun. 14, 2002].

STARDUST.COM; "CDN 2001 White Paper—The Ins and Outs of Content Delivery Networks," Stardust.com, Inc., Los Gatos, California, 19 pg., Dec. 20, 2000.

* cited by examiner

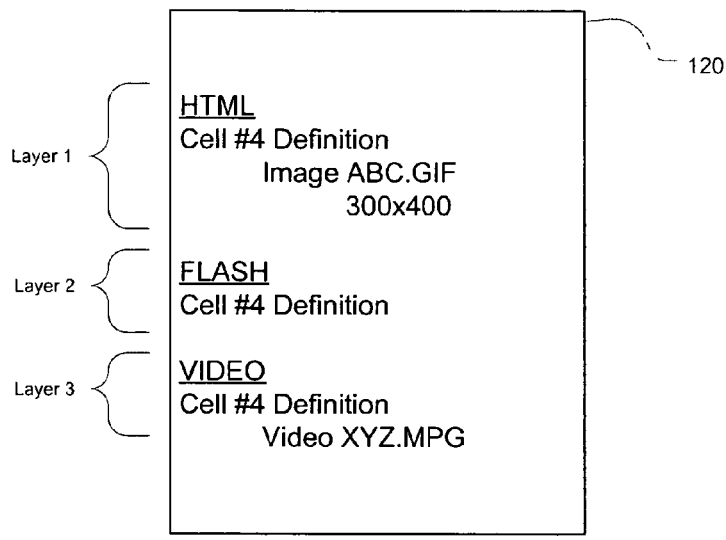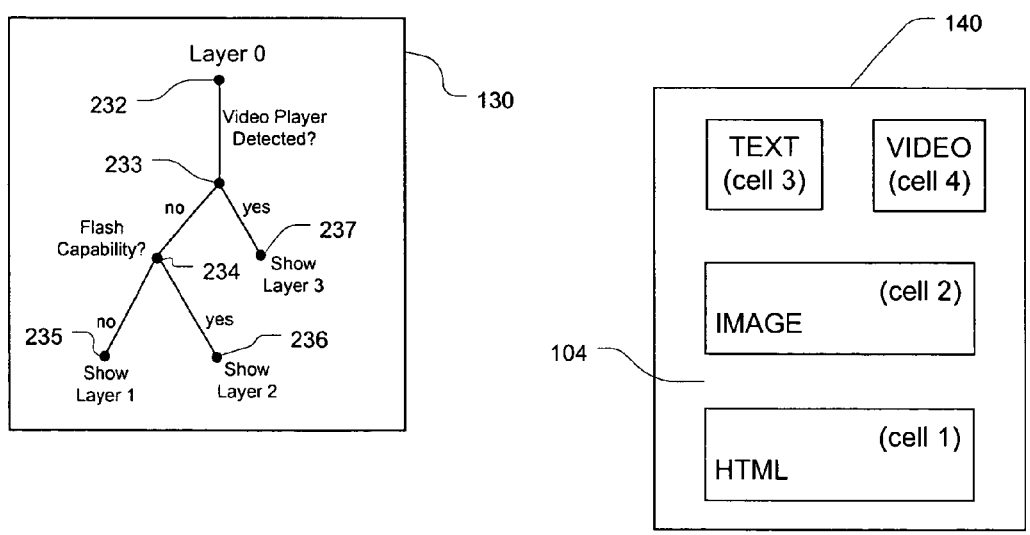
Figure 2

ADAPTIVE ELECTRONIC MESSAGING

RELATED APPLICATIONS

The present application is a continuation application claiming priority to U.S. Nonprovisional application Ser. No. 10/976,057, filed on 27 Oct. 2004, titled "ADAPTIVE ELECTRONIC MESSAGING," which is a continuation-in-part of U.S. Nonprovisional application Ser. No. 10/611,698, filed on 30 Jun. 2003, titled "ADAPTIVE MEDIA MESSAGING, SUCH AS FOR RICH MEDIA MESSAGES INCORPORATING DIGITAL CONTENT," which claims priority to U.S. Provisional Application No. 60/393,176, filed on 1 Jul. 2002, titled "ADAPTIVE RICH MEDIA MESSAGING," the entire disclosures of which are hereby incorporated by reference

FIELD OF INVENTION

This present invention is directed to the field of electronic messaging, and in particular to adaptive electronic messaging.

BACKGROUND

Electronic mail ("email") is a form of electronic messaging that has proven a useful medium for several different types of communications. In particular, email has been used to deliver marketing messages to single recipients and groups of recipients.

Initially, such email-conveyed messages were expressed in plain-text format. One advantage of the plain-text format is that recipients can read such messages no matter what email client program ("email client") they use. A significant disadvantage of the plain-text format is that its display is undistinguished and unattractive relative to other types of visual displays possible on many computer systems, and is in that sense poorly suited to direct promotional marketing and other high impact business communications. Furthermore, recipient activity with the message cannot be tracked, representing another significant business limitation.

As an improvement to text based messaging, email clients capable of sending and receiving more complex electronic messages have been developed. While this may facilitate somewhat richer and more colorful displays than plain-text format, such messages are typically static, not trackable, and still relatively poorly suited to achieve high impact with recipients.

Although in certain occasions it might be desirable to send complex messages including multimedia components to recipients, not all recipients may be capable and/or authorized to receive or view such messages.

BRIEF DESCRIPTION OF THE DRAWINGS

The invention is illustrated by way of example and not by way of limitation in the figures of the accompanying drawings, in which the like references indicate similar elements and in which:

FIG. 2 illustrates one embodiment of a message adaptation specification;

DETAILED DESCRIPTION OF EMBODIMENTS OF THE INVENTION

In the description to follow, various aspects of the present invention will be described, and specific configurations will be set forth. However, embodiments of the present invention may be practiced with only some or all aspects, and/or without some of these specific details. In other instances, well-known features may be omitted or simplified in order not to obscure the description.

The description will be presented in terms of operations performed by a processor based device, using terms such as receiving, determining, identifying, displaying and the like, consistent with the manner commonly employed by those skilled in the art to convey the substance of their work to others skilled in the art. As is well understood by those skilled in the art, the quantities take the form of electrical, magnetic, or optical signals capable of being stored, transferred, combined, and otherwise manipulated through mechanical, electrical and/or optical components of the processor based device.

Various operations will be described as multiple discrete steps in turn, in a manner that is most helpful in understanding embodiment of the present invention, however, the order of description should not be construed as to imply that these operations are necessarily order dependent. In particular, these operations need not be performed in the order of presentation.

The description repeatedly uses the phrase "in one embodiment", which does not necessarily refer to the same embodiment, although it may. Furthermore, the terms "comprising", "including", "having", and the like, as used in the present application, are synonymous.

In accordance with embodiments of the invention, adaptive electronic message services are provided for generating and supplementing adaptive electronic messages with digital content items. The adaptive electronic messages may be supplemented, either before or after delivery to a recipient, with one or more digital content elements that may be selected from a group of digital content element candidates. In one embodiment, digital content elements may be identified to supplement an electronic message based upon one or more message adaptation specifications that may be associated with one or more recipients or devices. In one embodiment, digital content elements may be identified based upon one or more preferences, capabilities, and/or configurations associated with a recipient or a corresponding receiving device as may be indicated by a message adaptation specification.

Figure 1:
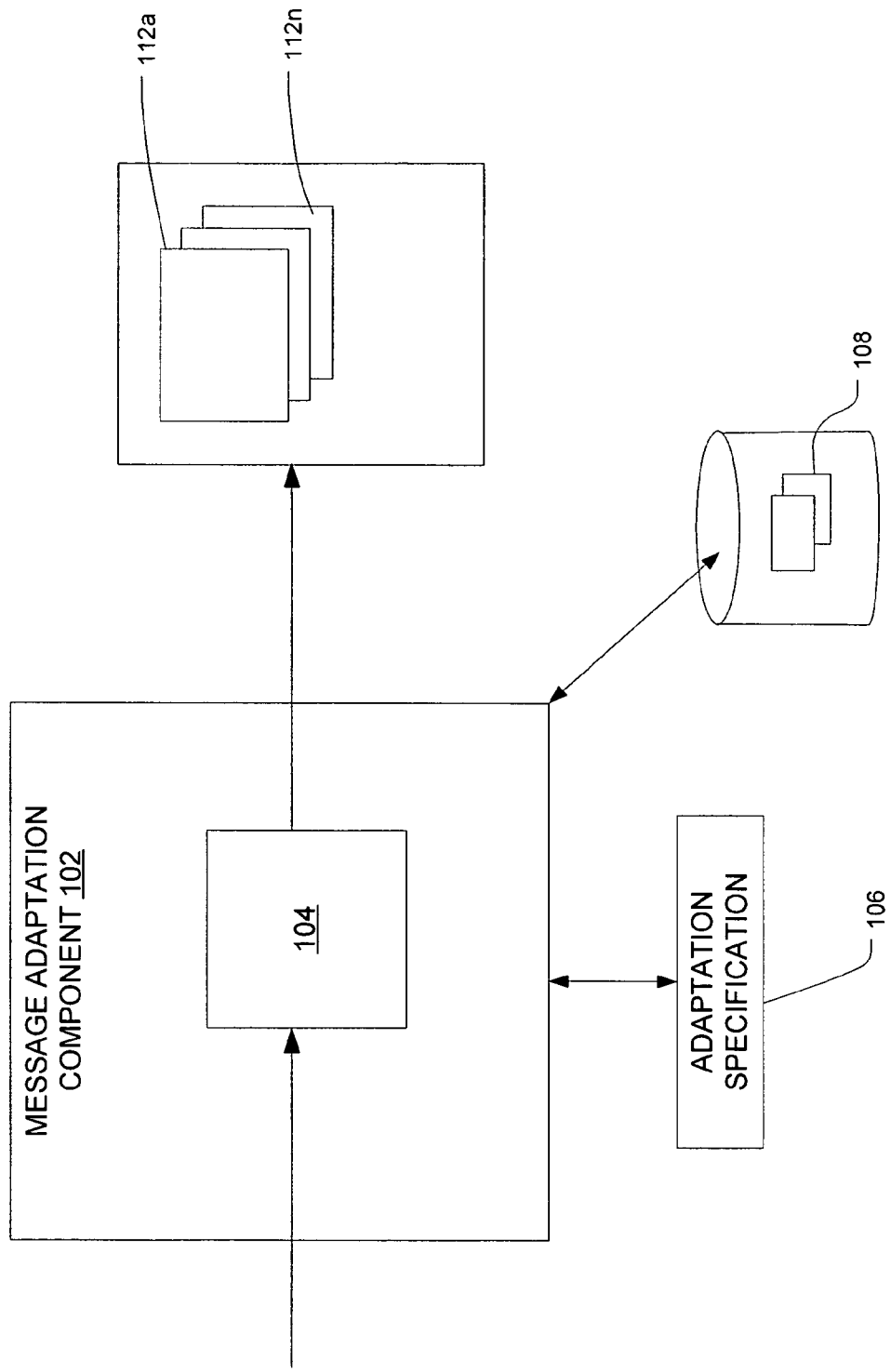
FIG. 1 illustrates an overview of message adaptation services in accordance with one embodiment of the invention.

FIG. 1 illustrates an overview of message adaptation services in accordance with embodiments of the invention. In one embodiment, message adaptation component 102 may operate to generate an adapted electronic message 110 based at least in part upon a message adaptation specification 106. In one embodiment, one or more digital content elements 112*a*-112*n* may be selected from a plurality of differently versioned digital content element candidates 108 to supplement a base electronic message 104. The base electronic message 104 may in turn, be adapted to include either the selected digital content elements 112a-112n or references thereto. In accordance with one embodiment, one or more client or server devices associated with a sender, a recipient, or a third party may be equipped with message adaptation component 102 to provide the message adaptation services described herein.

As used herein, the term 'component' is intended to refer to programming logic that may be employed to obtain a desired outcome. The term component may be synonymous with 'module' and may refer to programming logic that may be embodied in hardware or firmware, or to a collection of software instructions, possibly having entry and exit points, written in a programming language, such as, for example, C++. A software component may be compiled and linked into an executable program, or installed in a dynamic link library, or may be written in an interpretive language such as BASIC. It will be appreciated that software components may be callable from other components/modules or from themselves, and/or may be invoked in response to detected events or interrupts. Software instructions may be embedded in firmware, such as an EPROM or may be stored on a readable medium such as a magnetic or optical storage device. It will be further appreciated that hardware components may be comprised of connected logic units, such as gates and flip-flops, and/or may be comprised of programmable units, such as programmable gate arrays or processors. In one embodiment, the components described herein are implemented as software modules, but nonetheless may be represented in hardware or firmware. Furthermore, although only a given number of discrete software/hardware components may be illustrated and/or described, such components may nonetheless be represented by additional components or fewer components without departing from the spirit and scope of embodiments of the invention.

The term 'digital content elements', is intended to broadly refer to multimedia or rich media elements or objects, such as, but not limited to audio and video (including multi-frame video and still images), animations, clips, files and data streams. Digital content elements may also refer to links or other user interface controls designed to enable recipients to obtain further information about a message, to forward the message to another recipient, to request to not receive similar messages in the future, and so forth.

In accordance with one embodiment of the invention, an electronic message, such as base electronic message 104, may be supplemented with one or more such digital content elements. The term 'supplement' is broadly used herein to describe manners in which an electronic message may be adapted. For example, a base electronic message comprising only text elements may be supplemented with one or more digital content elements such as a video segment to enhance the overall presentation of the electronic message to a recipient. Similarly, a base electronic message comprising text and digital image elements may be supplemented with one or more video elements such that image (or other) elements are replaced by the video element(s). Accordingly, adapted electronic messages may contain a greater or a fewer number of digital content elements after a base electronic message has been supplemented. Similarly, the overall size or length of an adapted electronic message may be larger or smaller than that of the base electronic message. Thus, supplementing can be an additive function, a subtractive function, or a substitutive function.

During formation of an adaptive electronic message, digital content elements may be linked to an electronic message or may be embedded within an electronic message through techniques such as object linking and embedding (OLE), or the use of uniform resource identifiers (URIs) or uniform resource locators (URLs) for example. Other methods of linking and/or embedding digital content elements to an electronic message may similarly be employed without departing from the spirit and scope of the invention.

Content element candidates 108 may be stored locally in the same device/network domain as message adaptation component 102, or in a device/network domain that may be remote to message adaptation component 102. Additionally, content element candidates 108 may be aggregated within a single data store or distributed across multiple data stores.

In accordance with one embodiment of the invention, message adaptation specification 106 may, in cooperation with message adaptation component 102, facilitate the flexible and extensible adaptation of electronic messages such as, but not limited to email. In one embodiment, message adaptation specification 106 may be device-specific or user-specific. For example, message adaptation specification 106 may indicate one or more operational capabilities of one or more devices, such as a message-receiving device ("receiving device") associated with an intended recipient. Such operational capabilities may include multimedia presentation capabilities of a device, content rendering capabilities of a device, data throughput/bandwidth capabilities of a device, and may identify whether a device is configured as a wireless device or traditional, non-wireless or wireline device, and so forth. Additionally, message adaptation specification 106 may further represent user-specific (or company/entity-specific) preferences such as a message filtering level indicating e.g. a preferred message delivery policy with respect to one or more recipients. In one embodiment, message adaptation specification 106 may represent a collection of user-specific or device-specific message adaptation specifications that may be selectively employed based upon identification of an intended recipient of an adaptive electronic message.

In one embodiment, message adaptation specification 106 may include a message layer definition to define alternative presentations or layers for a given adaptive electronic message, where each presentation may represent a different combination of digital content element candidates. In one embodiment, an adaptive electronic message may include one or more content cells that may be adapted to include a version of one or more digital content elements selected from the digital content element candidates 108 as may be appropriate for a given message presentation. As such, it is possible to generate an electronic message that may be adapted to take advantage of particular device-specific or user-specific message adaptation configurations or preferences. For example, in accordance with one embodiment, an electronic message may be adapted to take advantage of capabilities that may be specific to a receiving device. Similarly, adaptive electronic messages may be adapted or otherwise processed based upon recipient-specified or even sender-specified message delivery preferences.

In one embodiment, message adaptation specification 106 may include decision logic to directly or indirectly determine which digital content items (e.g. as specified in the message layer definition) may be exposed to a recipient. In one embodiment, the decision logic may operate to select at least one of the message layers specified in the message layer definition for use in adapting the base message. In one embodiment, the message layer definition may be embodied in a markup language such as HTML, whereas the decision logic may be embodied as a binary tree structure. However, other data representation and/or programming techniques may be employed. In one embodiment, the message layer definition and decision logic may be represented within a single data structure and/or file, whereas in another embodiment, the message layer definition and decision logic may be represented by different data structures and/or data files.

FIG. 2 illustrates one embodiment of message adaptation specification 106 including message layer definition 120 and decision logic 130. As shown, layer definition 120 includes specifications for three layers (layer 1, layer 2, and layer 3), each defining an alternative presentation for at least one content cell of an adaptive electronic message. In one embodiment, a content cell may represent a virtual area within an adaptive electronic message that may include one or more digital content element candidates. In one embodiment, the content element candidates may be selected based upon an identified presentation.

In one embodiment, decision logic 130 may directly or indirectly determine which cells or presentation layers of an adaptive electronic message are to be exposed to one or more recipients of a particular instance of the adaptive electronic message. In the illustrated embodiment, decision logic 130 includes a root node 232 and a number of leaf nodes 235-237. In one embodiment, root nodes may correspond to global content intended to appear in each instance of the adapted electronic that may be transmitted. Leaf nodes may correspond to a content layer associated with digital content elements as may be specified within message layer definition 120.

In the illustrated embodiment, decision logic 130 is designed to operate based upon capabilities of one or more receiving devices. In one embodiment, capabilities may be dynamically determined through execution of one or more client-side or server-side components or scripts. Accordingly, a recipient may receive a base electronic message including one or more scripts or components, or links to one or more remotely located scripts or components, which when executed, may determine various capabilities of the receiving device and request supplemental digital content elements accordingly. Alternatively, device capabilities may be predetermined and stored remotely on a server for access via a lookup table, file, or database by message adaptation component 102. As such, electronic messages may be remotely adapted with one or more content element candidates prior to transmission of the message to a recipient. Of course, electronic message adaptation may be conditioned on other factors besides device capabilities.

In one embodiment, base electronic message 104 may include digital content elements that are to be globally rendered on behalf of all addressed recipients for a given adaptive electronic message. For example, base electronic message 104 may contain digital content elements that represent a least common denominator with respect to presentation capabilities of recipient devices. As such, a sender can generate a base electronic message that may be viewable by each intended recipient. Because certain recipients may be able to view more advanced and/or engaging versions of the base electronic message, a sender or message author may define one or more cells within the base electronic message that may be dynamically adapted before or after transmission of the message to one or more recipients.

In one embodiment, predefined message templates such as message template 140 of FIG. 2 may be utilized to facilitate generation of one or more adaptive electronic messages. Such templates may be designed by a sender, a recipient, or a third party electronic message creation and/or mailing service, for example. In one embodiment, adaptive message templates may vary in complexity and may include, but are not limited to cell layout definitions specifying color, size and location of one or more adaptive message cells, and definitions of digital content elements to be displayed within one or more of the cells.

Message template 140 illustrates various adaptive content cells that may be defined within an electronic message such as base electronic message 104. In message template 140, five presentation cells are shown with each cell being associated with a different type of content element. For example, cell 1 may be designated to display HTML-based content elements, cell 2 may be designated to display image-based content elements, cell 3 may be designated to display text-based content elements, and cell 4 may be designated to display video-based content elements. Of course any combination of cells and designated content element-types may be defined as determined e.g. by an author of an adaptive message. Moreover, each cell may be designated to display a variety of content element-types.

In the example embodiment illustrated by FIG. 2, root node 232 of decision logic 130 represents layer 0 or a base layer of an adaptive electronic message. Layer 0 may include definitions of text or digital content items that are intended to be received by each message recipient. Alternatively, non-adaptive content typically contained within a base layer may instead be defined within layer definition 120 and optionally omitted from decision logic 130. At node 233 of decision logic 130, a determination may be made as to whether a recipient device contains video-rendering capabilities. Such a determination may be made through examination of one or more files or directories on the device. If it is determined that a recipient device does contain video rendering capabilities as may be manifested by the absence of a video player application, layer 3 of layer definition 120 may be exposed to the recipient. That is, the electronic message may be adapted to include digital content element candidates as may be specified in layer 3 of layer definition 120. If it is determined that a recipient device does not contain video rendering capabilities, a further decision may be made at node 234 regarding whether the device has FLASH capabilities. If the device is determined to have FLASH capabilities, layer 2 of layer definition 120 may then be exposed to the recipient. However, if a device does not have FLASH capabilities, the electronic message may be adapted to expose to the recipient, only those digital content items as may be associated with layer 1 of layer definition 120.

Decision logic 130 could alternatively be associated with a wide variety of other criteria such as device capabilities including but not limited to graphic capabilities, and video bandwidth capabilities. For example, in the event decision logic 130 represents video bandwidth capabilities of a device, layer 1 could be associated with digital content elements that, for best performance, require a network bandwidth that may be achievable by most devices (e.g., <50 kb/s). In contrast, layer 2 could be associated with digital content elements that are best viewed on devices having medium network bandwidth connectivity e.g. in the range between 50 kb/s & 100 kb/s, while layer 3 could be associated with digital content elements that may be best viewed only on devices having high network bandwidth connectivity (e.g., >100 kb/s). Of course, the number and arrangement of decision nodes appearing in decision logic 130 may be application specific, and as such, may include a fewer or a greater number of nodes than those illustrated.

Figure 3:
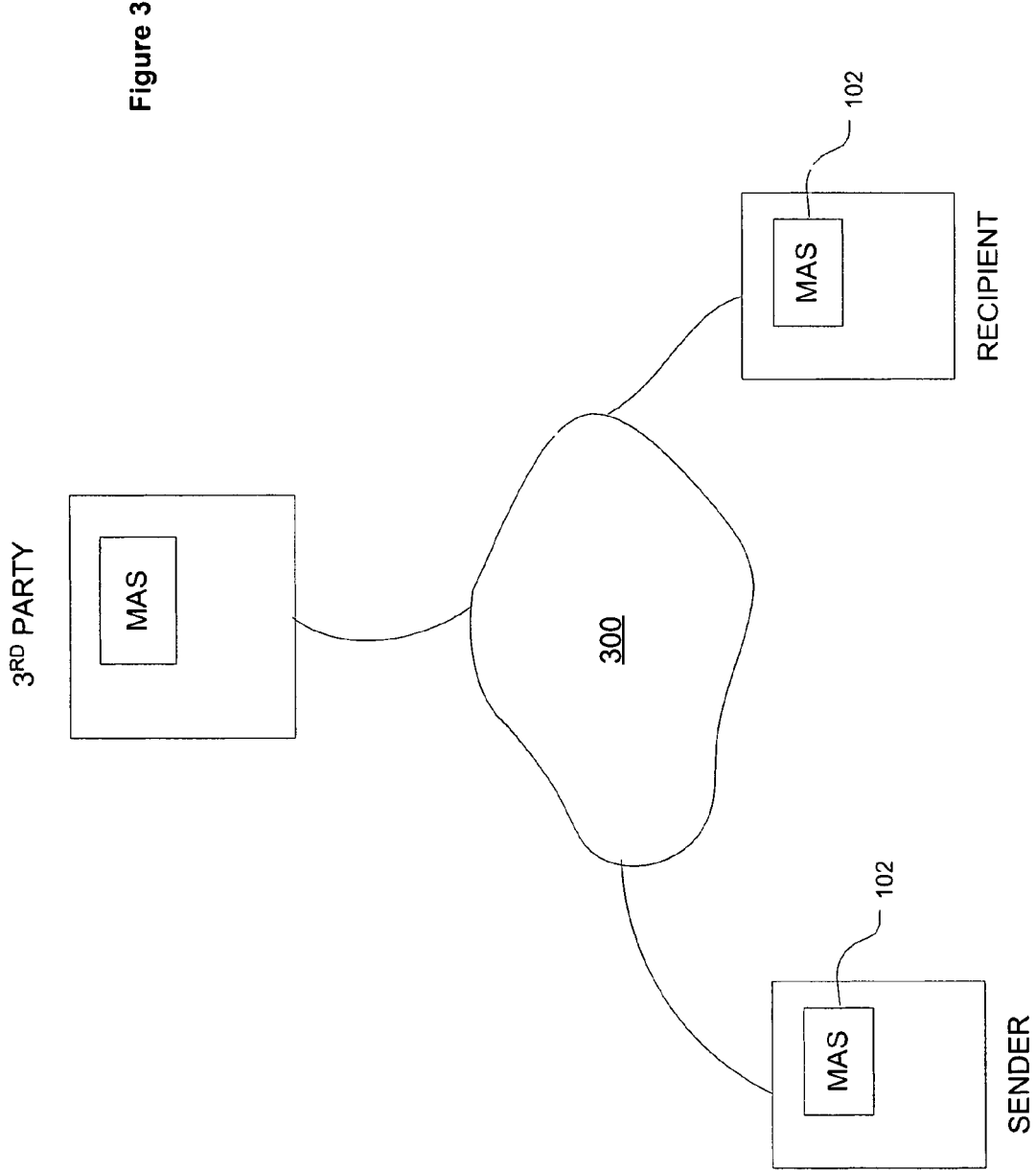
FIG. 3 illustrates a network environment within which the message adaptation services in accordance with one embodiment of the invention may be practiced.

FIG. 3 illustrates a network environment within which the message adaptation services in accordance with one embodiment of the invention may be practiced. As shown, sending device 302, receiving device 304, and $3^{rd}$ party server 306 may each be communicatively coupled to network 300. Network 300 may represent one or more data communication networks ranging from a local network to one or more global interconnected networks such as the Internet or World Wide Web.

In accordance with one embodiment of the invention, one or more of sending device 302 (also referred to as a sending client), receiving device 304 (also referred to as a receiving client), and $3^{rd}$ party server 306 may be advantageously equipped with message adaptation services (MAS) 102 as shown. Sending device 302 may represent one or more devices used by one or more parties (e.g. senders) to compose and send adaptive electronic messages in accordance with one embodiment of the invention. Sending devices may include user-devices and/or server devices such as a mail server equipped with message adaptation services 102 that facilitate creation and transmission of adaptive electronic messages. Similarly, receiving device 304 may represent one or more devices used by one or more parties (e.g. recipients) to receive and view adaptive electronic messages in accordance with one embodiment of the invention. Correspondingly, the sending devices may include user-devices and/or server devices such as a mail server equipped with message adaptation services 102. Third party server 306 may represent one or more devices controlled by a third party entity (e.g. not a sender or recipient) which may facilitate in the composition and/or delivery of adaptive electronic messages in accordance with one embodiment of the invention.

One or more of sending device 302, receiving device 304, and $3^{rd}$ party server 306 may be co-located with one or more of the other devices within a shared network domain. Moreover, although not illustrated, one or more of sending device 302, receiving device 304, and $3^{rd}$ party server 306 may be co-located with a mail server designed to deliver and receive electronic mail messages in accordance with a wide variety of message transfer protocols, including the well-known simple mail transfer protocol (SMTP). Such a mail server may be a hardware based device or a software service that executes on any one or more of sending device 302, receiving device 304, and $3^{rd}$ party server 306.

Sending device 302, receiving device 304, and $3^{rd}$ party server 306 may each represent a broad range of digital systems known in the art, including but not limited to devices such as wireless mobile phones, palm sized personal digital assistants, notebook computers, desktop computers, servers, set-top boxes, game consoles and the like.

Figure 4:
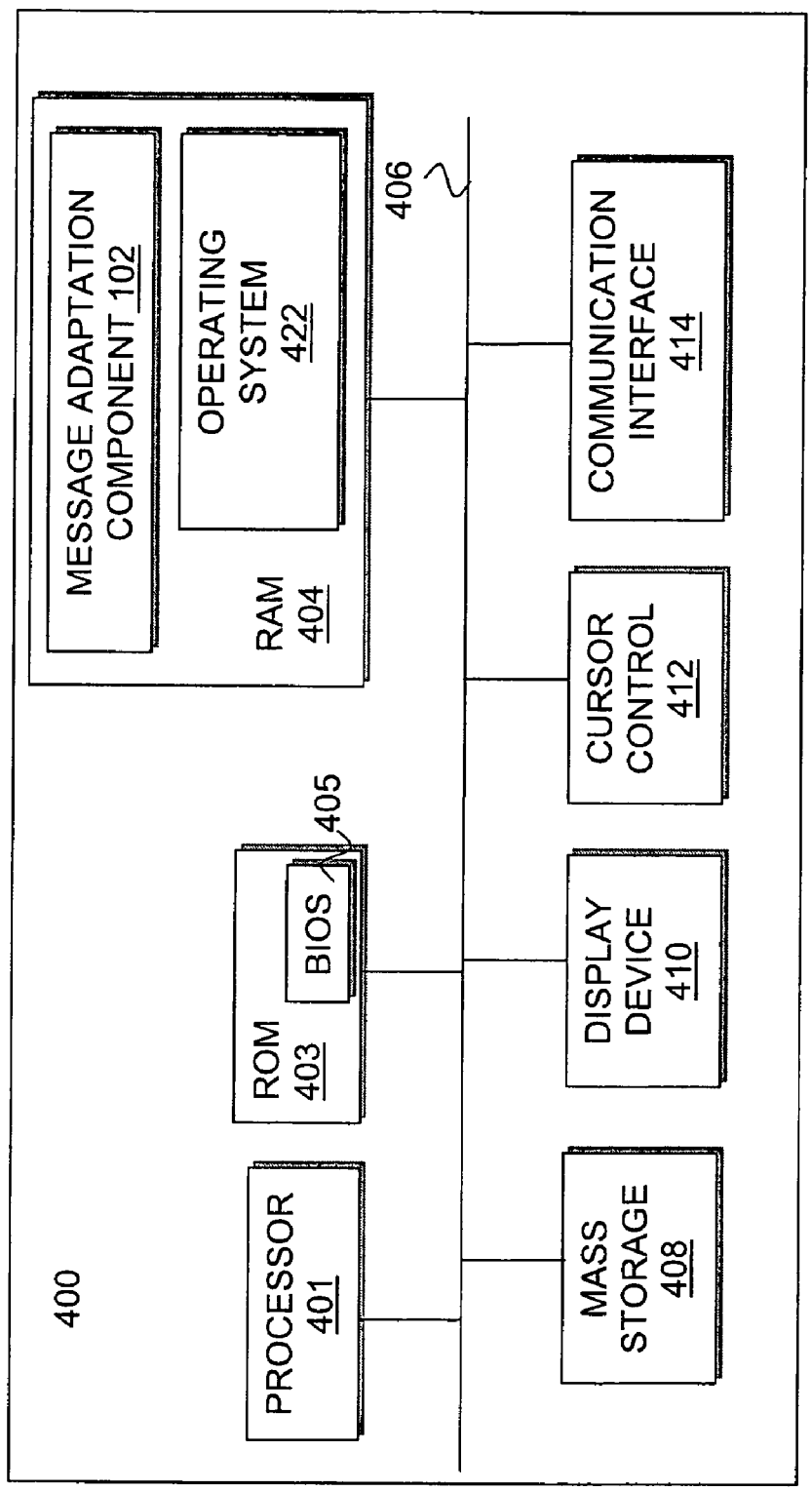
FIG. 4 illustrates an example computer system suitable to provide the message adaptation services in accordance with one embodiment of the invention.

FIG. 4 illustrates an example computer system generally suitable for use as sending device 302, receiving device 304, and $3^{rd}$ party server 306 in accordance with the teachings of the present invention. As shown, example computer system 400 includes processor 401, ROM 403 including basic input/output system (BIOS) 405, and system memory 404 coupled to each other via communication bus 406. Also coupled to communication bus 406 is non-volatile mass storage 408, display device 410, cursor control device 412 and communication interface 414. During operation, memory 404 may include working copies of operating system 422, and message adaptation component 102. In the case of a sending or receiving client, memory 404 may further include working copies of one or more message layer definitions and decision logic according to one embodiment of the present invention.

Except for the teachings of the present invention as incorporated herein, each of these elements may represent a wide range of these devices known in the art, and otherwise may perform its conventional functions. For example, processor 401 may perform the function of executing programming instructions of operating system 422 and message adaptation component 102. ROM 403 may be EEPROM, Flash and the like, and memory 404 may be SDRAM, DRAM and the like. Communication bus 406 may represent a single bus or a multiple bus implementation. In other words, bus 406 may include multiple properly bridged buses of identical or different kinds, such as Local Bus, VESA, ISA, EISA, PCI and the like.

Mass storage 408 may represent disk drives, CDROMs, DVD-ROMs, DVD-RAMs and the like. Mass storage 408 may include a persistent copy of operating system 422 and message adaptation component 102. The persistent copy may be downloaded from a distribution server through a data network (such as network 300), or installed in the factory, or in the field. For field installation, the persistent copy may be distributed using one or more articles of manufacture such as diskettes, CDROM, DVD and the like, having a recordable medium including but not limited to magnetic, optical, and other mediums of the like.

Display device 410 may represent any of a variety of display types including but not limited to a CRT and an active or passive matrix LCD display. Cursor control 412 may represent a mouse, a touch pad, a track ball, a keyboard, and the like to facilitate user input into the system. Lastly, communication interface 414 may represent a modem interface, an ISDN adapter, a DSL interface, an Ethernet or Token ring network interface and the like.

In one embodiment of the invention, message adaptation component 102 may provide authoring services for the benefit of one or more sending parties. In one embodiment, the authoring services may include services to facilitate generation of a message adaptation specification possibly including a message layer definition and/or decision logic. Additionally, the authoring services may provide a message-editing environment through which a sender may compose an adaptive electronic message. In one embodiment, the authoring services may provide graphical or text-based tools to facilitate generation of the adaptive electronic messages as well as corresponding message layer definitions and decision logic.

In one embodiment, through the authoring environment, a sender may access one or more predefined adaptive message templates. The adaptive message templates may include format definitions and/or content definitions for one or more adaptive cells within the template. Additionally, the adaptive message templates may provide editable data fields through which a sender may further customize the look and content of an adaptive electronic message.

In one embodiment, a sender may choose to create an adaptive electronic message by first composing or selecting a previously composed base electronic message. Next, the sender may generate or select a message adaptation specification including previously generated message layer definitions and corresponding decision logic, if appropriate. Alternatively, the message adaptation specification may be automatically selected for the sender based e.g. upon one or more criteria. The authoring environment may then determine the fields and/or cells that are sender-customizable and may provide the sender with an opportunity to customize the base electronic message. Once the sender submits their customizations (if any), the fields within the adaptive electronic message may be populated and a message record may be made in a message database referencing, for example, the message layer definition, the decision logic, sender customizations and populated fields and so forth. An instance of that message record may then be created and transmitted as an adaptive electronic message to one or more indicated recipients. In one embodiment, one message instance may be created for each indicated recipient.

In one embodiment, the adaptive electronic message may be dynamically adapted after transmission of the message to one or more recipients. In another embodiment of the invention, the adaptive electronic message may be dynamically adapted prior to transmission of the message to one or more recipients.

Figure 5:
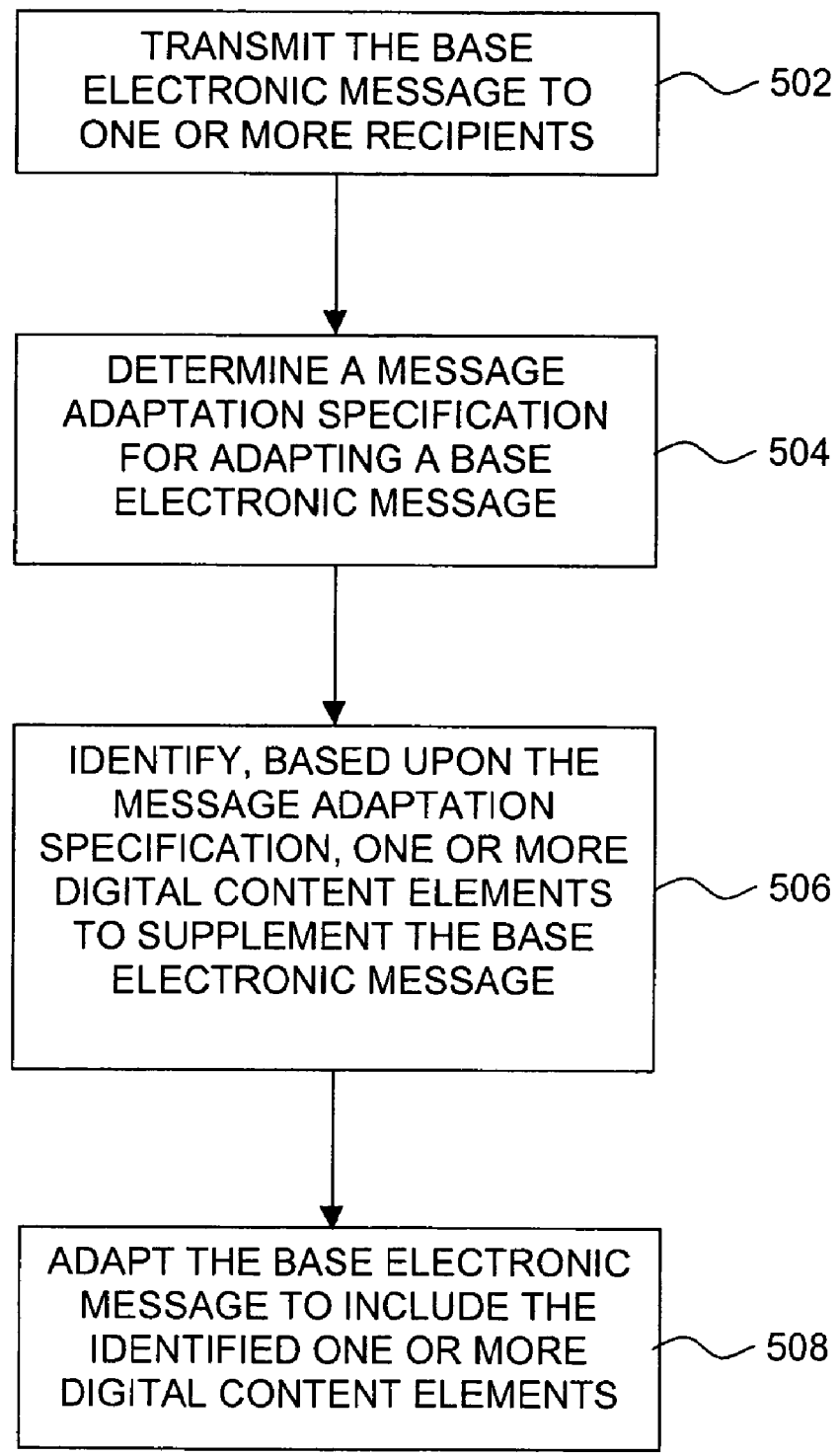
FIG. 5 is an operational flow diagram illustrating post-transmission adaptation of an electronic message in accordance with one embodiment of the invention.

FIG. 5 is an operational flow diagram illustrating post-transmission adaptation of an electronic message in accordance with one embodiment of the invention. As shown, a base electronic message is transmitted to one or more recipients at block 502. A message adaptation specification for adapting the based electronic message is determined at block 504, and one or more digital content elements are identified to supplement the base electronic message based at least in part upon the message adaptation specification at block 506. Lastly, at block 508, the base electronic message is adapted to include the identified one or more digital content elements. In one embodiment, the base electronic message may be adapted by a receiving device associated with a recipient or an intermediate mail server configured to forward messages to the recipient.

In some embodiments, the base electronic message may include an initial content layer, to which client-side scripts and recipient-specific customization information may be added through the adaptation process. The added client-side scripts may perform such functions as: reporting on the opening of the email message; testing the digital content capabilities of the receiving device associated with the recipient; selecting the most appropriate layer of the message to be exposed to the user based upon the results of the tests; and supplementing (including possibly replacing) the contents of the message with those of the selected layer. The recipient-specific customization information may include special information designed to appeal specifically to the recipient, such as the recipient's name, or a message thanking the recipient for making a recent purchase.

When one of these adaptive email messages is received, it may be stored in an email inbox on the recipient's system. When the recipient opens the email message, the initial layer may be displayed within the email message on the recipient's display device. The initial layer may contain an image tag that causes a very small image to be downloaded from a server system, thereby notifying the server system of the message opening as e.g. for tracking purposes. Other layers of the adaptive electronic message may also contain such an image tag, similarly facilitating the tracking of their respective opening.

If script-processing functionality is available and enabled on a receiving device, the scripts in the adaptive message may be executed in order to test one or more capabilities such as media presentation capabilities of the receiving device. The scripts may also operate to select the most appropriate layer of the adaptive message to be exposed to the recipient based upon the results of the various tests. The scripts may further operate to supplement (e.g. though addition, removal, or replacement) the contents of the adaptive message with those of the selected layer.

If script-processing functionality is not available or is not enabled, scripts contained in the adaptive message may not execute. As a result, the initial or base layer of an adaptive message may include a link that the recipient may manually traverse in order to open the first layer in a browser window, which may operate in a similar manner as described above with respect to the scripts.

Figure 6:
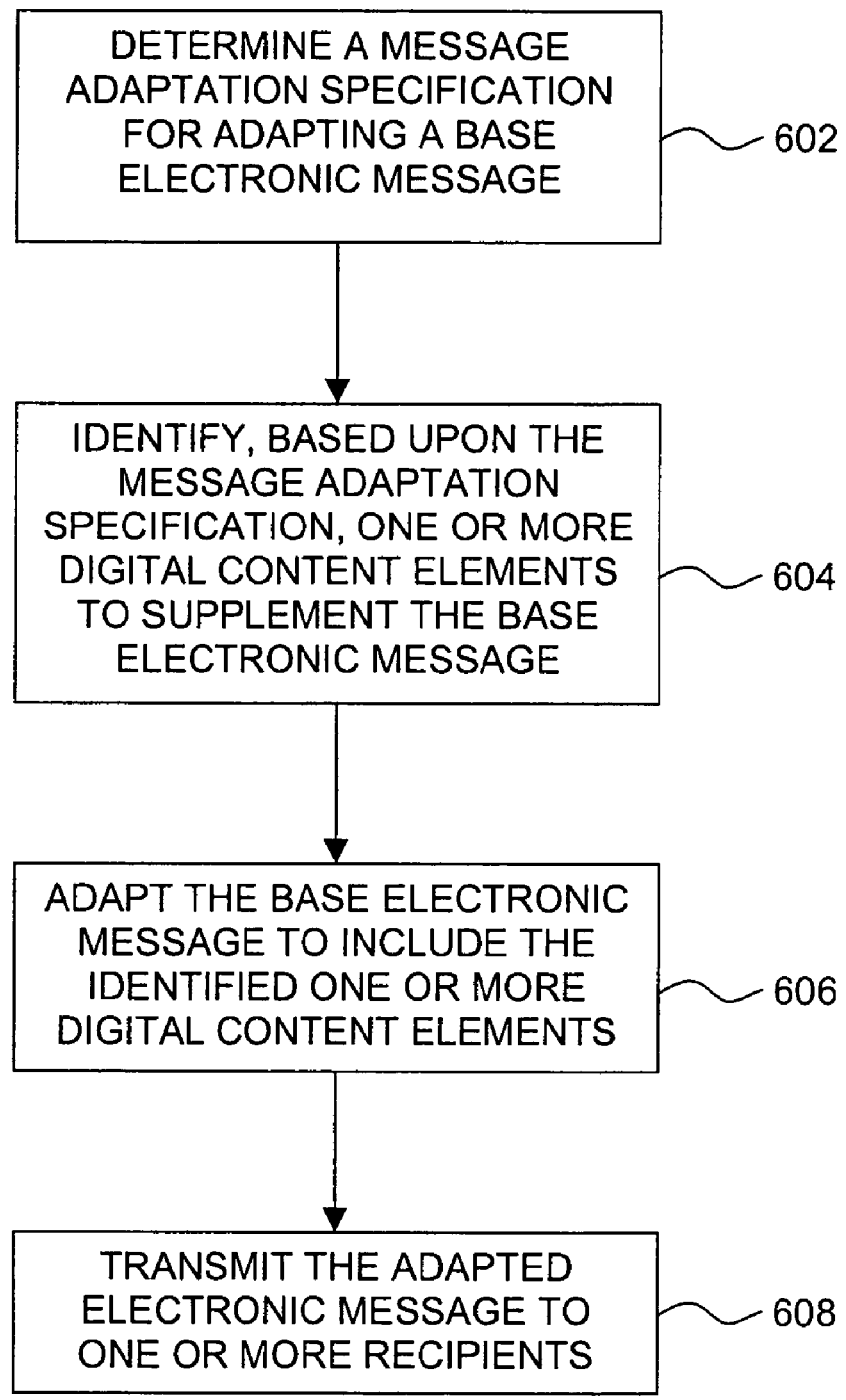
FIG. 6 is an operational flow diagram illustrating pre-transmission adaptation of an electronic message in accordance with one embodiment of the invention.

FIG. 6 is an operational flow diagram illustrating pre-transmission adaptation of an electronic message in accordance with one embodiment of the invention. As shown, a message adaptation specification for a base electronic message is determined at block 602. At block 604, one or more digital content elements are identified to supplement the base electronic message based upon the message adaptation specification. The message is then adapted to include the identified one or more digital content elements at block 606, and the adapted electronic message is transmitted to one or more recipients at block 608.

In one embodiment of the invention, message adaptation component 102 may facilitate the pre-transmission adaptation of electronic messages based upon the particular configuration of a receiving device used by a recipient. More specifically, in accordance with one embodiment of the invention, message adaptation component 102 may operate to adapt electronic messages based upon whether a receiving device associated with an intended message recipient is identified as being a wireless device or a traditional wireline device.

For the purpose of this disclosure, the term wireless device is intended to refer to a broad class of devices such as, but not limited to mobile phones, personal digital assistants, notebook computers, and so forth, that receive electronic messages wirelessly over the airwaves. A wireless device need not operate in accordance with any particular wireless protocol, however examples of such wireless protocols may include Code-Division Multiple Access (CDMA), Time-Division Multiple Access (TDMA), Global System for Mobile Communications (GSM), Wireless Application Protocol (WAP) and the like. A traditional wireline device on the other hand is intended to refer to any device that receives messages via a physical cable coupled to a data network.

In general, since the network bandwidth capabilities of traditional wireline devices may exceed that of wireless devices, it may be advantageous to adapt electronic messages that are destined for wireless devices prior to their transmission to corresponding recipients. By doing so, it may be possible to reduce network connectivity and corresponding air-time costs, reduce required message download time, while at the same time improve the overall user/recipient experience. Even if network connectivity speeds for wireless networks can eventually approximate that of traditional wireline networks, it may nonetheless still be advantageous to supplement adaptive electronic messages prior to their transmission due at least in part to the typically limited hardware capabilities of wireless devices. For example, because traditional wireless devices, such as mobile phones and personal digital assistants, are typically equipped with less powerful hardware (including displays and memory) and software components than their wireline counterparts, it may further be advantageous to adapt electronic messages prior to their transmission to such devices to account for such potential limitations. In one embodiment, digital content elements may be selected for pre-transmission adaptation based upon the element's respective network connectivity bandwidth requirements.

In one embodiment of the invention, message adaptation component 102 may facilitate the pre-transmission adaptation of electronic messages based upon a message filtering or security level. More specifically, in one embodiment, adaptation of electronic messages may be conditioned upon a message filtering level associated with a recipient or a company through which the recipient may receive email service.

In one embodiment, a recipient may preemptively opt to receive electronic messages (e.g. opt-in) or opt to not receive electronic messages (e.g. opt-out). In one embodiment, a recipient may further stipulate criteria that if met, would facilitate determining whether electronic messages should be delivered to the recipient or blocked from delivery to the recipient. Such message filtering criteria may include, but is not limited to identification of a sender, sender domain, priority, subject of the message, content of the message, transmission protocol, and so forth. In one embodiment, the filtering criteria may be represented within message adaptation specification 106. In one embodiment, the filtering criteria may be embodied within a logic structure such as decision logic 130, while message layer definition 120 may be used to identify digital content element candidates for supplementing the message based upon the recipient's opt-in or opt-out status.

In accordance with one embodiment of the invention, an adaptive electronic message may be supplemented with a solicitation for a recipient to receive one or more electronic messages in the future. In one embodiment, the solicitation may take the form of an electronic token that is embedded within a base electronic message prior to its transmission to the recipient. Upon receipt, the base electronic message may be displayed to the recipient including a text or graphic-based query soliciting the recipient as to whether they wished to receive additional email messages (or to have the viewed base electronic message otherwise adapted). The recipient may be queried as to whether they wish to receive any additional messages at all, or whether they wish to receive additional messages of a particular type or class as may be determined by e.g. the identity of the sender or sender's mail domain, the subject of the message, the content or priority of the message, and so forth. The query may be accompanied by an HTML based FORM element to enable the recipient to choose to "opt-in" to receive additional electronic messages of the stipulated class or to "opt-out" resulting in additional electronic messages of the stipulated class being blocked. Upon the recipient selecting one option or another, embedded data may be POSTed back to a server in conjunction with the electronic token. Thereafter, a server-based system may update a remotely stored message filtering profile indicating the recipients' manifest desires.

In one embodiment of the invention, message adaptation component 102 may be used to facilitate large-scale electronic mailings or on-line advertising campaigns where a variety of electronic messages may be supplemented with digital content elements that may be tailored to the target audience, such as the recipient's name, logos associated with known interests of the recipients, a personalized message thanking the recipient for making a recent purchase, and so forth. In one embodiment, such ad-campaign messages may be adapted prior to transmission to a recipient, after transmission to a recipient, or both.

In one embodiment, ad messages that are adapted prior to transmission to a recipient may be adapted to include an opt-out/opt-in solicitation as described above. For example, for a given advertising campaign one or more base electronic messages could be generated and transmitted to one or more recipients. The base electronic messages may each include query soliciting each recipient as to whether they wish to receive additional email messages (from the sender or third-party mailing service. For each recipient that chooses to accept the offer to receive additional electronic mail messages, an entry may be created in a remote database or lookup table. Alternatively, an entry may be created in a remote database or lookup table for each recipient that chooses to decline offer to receive additional electronic mail messages. For each subsequent electronic advertising campaign, a sender or third part mailing service may be required (e.g. by the advertiser or other party) to first determine whether the a particular recipient has "opted in" or "opted out". In one embodiment, if the recipient has opted in, the electronic message may be delivered to the recipient with or without adaptation. However, if the recipient has opted out, the sender or third part mailing service may be required to withhold transmission of the electronic message. In one embodiment, if a recipient's manifest desire to receive additional electronic messages cannot be determined, the electronic message may be adapted to include a solicitation as previously described.

In one embodiment of the invention, a company who operates a mail server for the benefit of its employees may also utilize the message adaptation services of embodiments of the present invention. More specifically, in one embodiment a company may institute one or more security policies with respect to the receipt of electronic mail messages. In one embodiment, message adaptation component 102 (of FIG. 1) may be incorporated within a mail server, router or firewall device to facilitate enforcement of such security policies utilizing the recipient opt-in/opt-out statuses described above. In one embodiment, security levels may correspond to specific message filtering levels that may cause electronic messages to be delivered to an indicated recipient, blocked (e.g. at a recipient mail server or firewall) from being delivered to the recipient, or dynamically adapted based upon one or more policies as e.g. indicated in a message adaptation specification. In one embodiment, adapted electronic messages may be supplemented with a solicitation in accordance with one embodiment of the invention. In one embodiment, messages may be delivered, blocked or adapted based upon a recipient's opt-in/opt-out preference or other criteria described herein. Moreover, recipient opt-in/opt-out preferences may be stored one a server belonging to the sender, a third party mailer, the advertiser or the recipient.

Although specific embodiments have been illustrated and described herein, it will be appreciated by those of ordinary skill in the art that a wide variety of alternate and/or equivalent implementations calculated to achieve the same purposes may be substituted for the specific embodiment shown. This application is intended to cover any adaptations or variations of the embodiments discussed herein.

What is claimed is:

1. In a computing system, a method of operation comprising:
   identifying, by a message adaptation component of the computing system, a message adaptation specification that includes:
   a message layer definition to indicate a first message layer and a second message layer corresponding to an adaptive electronic message, wherein the first message layer and the second message layer are respectively associated with a first digital content element and a second digital content element, and
   decision logic to facilitate selection of the first message layer or the second message layer;
   receiving, by the message adaptation component, a base electronic message;
   selecting, by the message adaptation component based on the message adaptation specification, the first message layer for adapting the base electronic message;
   accessing, by the message adaptation component, the first digital content element from a data store, wherein the first digital content element is accessible by the message adaptation component prior to said receiving of the base electronic message; and
   adapting, by the message adaptation component, the base electronic message to include the first digital content element to form an adapted electronic message.

2. The method of claim 1, further comprising:
transmitting the adapted electronic message to a recipient.

3. The method of claim 1, further comprising:
transmitting the base electronic message to a recipient; and
adapting the base electronic message by transmitting the first digital content element after said transmitting of the base electronic message to the recipient.

4. The method of claim 3, wherein adapting the base electronic message comprises incorporating one or more scripts into the base electronic message, wherein the one or more scripts, when executed on a client device associated with the recipient, retrieve the first digital content element.

5. The method of claim 1, further comprising:
determining one or more operational capabilities of a client device associated with the recipient; and
selecting the first message layer based on said determining.

6. The method of claim 5, wherein the one or more operational capabilities comprise multimedia presentation capabilities.

7. The method of claim 1, wherein the layer definition comprises a markup-language based file and the decision logic comprises a binary tree structure.

8. The method of claim 1, wherein said selecting comprises selecting the first message layer for adapting the base electronic message for a first recipient, and the method further comprises:
selecting the second message layer for adapting the base electronic message for a second recipient;
accessing the second digital content element from the data store, wherein the second digital content element is accessible by the message adaptation component prior to said receiving of the base electronic message; and
adapting the base electronic message to include the second digital content element to form another adapted electronic message.

9. The method of claim 8, wherein the first digital content element is a video content element and the second digital content element is a flash content element.

10. The method of claim 1, further comprising:
determining based upon the message adaptation specification, whether a recipient has opted to receive a class of electronic messages; and
adapting the base electronic message to include a solicitation for the recipient to receive electronic messages belonging to the class of electronic messages, if it is determined that the recipient has not opted to receive electronic messages belonging to the class of electronic messages.

11. The method of claim 10, further comprising:
transmitting the adapted electronic message including the solicitation to the recipient.

12. The method of claim 1, further comprising:
determining, based upon the message adaptation specification, whether a receiving device associated with a recipient is configured as a wireless device; and
selecting the first message layer based on said determining.

13. A system comprising:
one or more computer processors;
one or more data stores coupled to the one or more computer processors and configured to store a plurality of differently versioned digital content element candidates including a first digital content element and second digital content element; and
a message adaptation component configured to, in response to operation on the one or more computer processors:
identify a message adaptation specification that includes:
a message layer definition to indicate a first message layer and a second message layer corresponding to an adaptive electronic message, wherein the first message layer and the second message layer are respectively associated with the first digital content element and the second digital content element, and
decision logic to facilitate selection of the first message layer or the second message layer;
receive a base electronic message;
select, based on the message adaptation specification, the first message layer for adaptation of the base electronic message;
access the first digital content element from the one or more data stores, wherein the first digital content element is accessible by the message adaptation component prior to said receipt of the base electronic message; and
adapt the base electronic message to include the first digital content element to form an adapted electronic message.

14. The system of claim 13, wherein the message adaptation component is further configured, in response to operation on the one or more computer processors, to:
transmit the adapted electronic message to a recipient.

15. The system of claim 13, wherein the message adaptation component is further configured to, in response to operation on the one or more computer processors:
determine one or more operational capabilities of a client device associated with the recipient; and
select the first message layer for adapting the base electronic message based on the one or more operational capabilities of the client device.

16. The system of claim 13, wherein the message adaptation component is configured to select the first message layer for adaptation of the base electronic message for a first recipient, and is further configured to, in response to operation on the one or more computer processors:
select the second message layer for adaptation of the base electronic message for a second recipient;
access the second digital content element from the one or more data stores, wherein the second digital content element is accessible by the message adaptation component prior to said receipt of the base electronic message; and
adapt the base electronic message to include the second digital content element to form another adapted electronic message.

17. The system of claim 16, wherein the first digital content element is a video content element and the second digital content element is a flash content element.

18. The system of claim 13, wherein the message adaptation component is further configured to, in response to operation on the one or more computer processors:
determine, based upon the message adaptation specification, whether a receiving device associated with a recipient is configured as a wireless device; and
select the first message layer based on said determination.

19. The system of claim 13, wherein the message adaptation specification comprises a message template defining one or more presentation cells of an adaptive electronic message, and the message adaptation component is further configured to, in response to operation on the one or more computer processors, adapt the base electronic message based on the message template.

20. An apparatus comprising a non-transitory storage medium having stored therein programming instructions, which when executed are operative to enable the apparatus to:

identify a message adaptation specification that includes:
- a message layer definition to indicate a first message layer and a second message layer corresponding to an adaptive electronic message, wherein the first message layer and the second message layer are respectively associated with a first digital content element and a second digital content element, and
- decision logic to facilitate selection of the first message layer or the second message layer;

receive a base electronic message;

select, based on the message adaptation specification, the first message layer for adapting the base electronic message;

access the first digital content element from a data store, wherein the first digital content element is accessible by the message adaptation component prior to said receiving of the base electronic message; and adapt, by the message adaptation component, the base electronic message to include the first digital content element to form an adapted electronic message.

21. The apparatus of claim 20, wherein the first message layer is selected for adapting the base electronic message for a first recipient and the programming instructions are further operative to enable the apparatus to:

select the second message layer for adapting the base electronic message for a second recipient;

access the second digital content element from the data store, wherein the second digital content element is accessible by the message adaptation component prior to said receiving of the base electronic message; and adapt the base electronic message to include the second digital content element to form another adapted electronic message.

* * * * *